United States Patent Office 3,401,169
Patented Sept. 10, 1968

3,401,169
METHOD OF PREPARING WAX-POLYETHYLENE BLENDS
Ivor W. Mills, Glenolden, Pa., assignor to Sun Oil Company, Philadelphia, Pa., a corporation of New Jersey
No Drawing. Filed Mar. 19, 1965, Ser. No. 441,299
21 Claims. (Cl. 260—285)

ABSTRACT OF THE DISCLOSURE

Wax-polyethylene blends are improved with regard to the settling of the polyethylene by the addition of certain surface active agents.

---

This invention is an improved method of preparing wax-polyethylene compositions.

The addition of polyethylene to petroleum wax, i.e., paraffin or microcrystalline wax, in order to improve the properties of the wax is well known. Such compositions have proven particularly suitable in waterproofing cellulosic materials such as paperboard. A problem arises, however, in the preparation of such compositions because of the relatively poor solubility of the polyethylene in wax. Polyethylene-wax compositions are normally prepared by heating the wax to about 225°–250° F., adding the polyethylene to the resulting molten wax, and stirring the mixture until the polyethylene dissolves in the wax. At temperatures of 225°–250° F. the polymer will dissolve in the wax without much difficulty to yield a clear, homogeneous solution of polyethylene in wax. If such a solution is cooled, however, a temperature is reached, conventionally referred to as the cloud point and normally about 197° F., at which the polyethylene begins to precipitate from the wax. Even though the composition would have to be reheated to redissolve the polymer before it could be satisfactorily used for coating, say, paperboard, it would nonetheless be desirable to be able to hold the composition at a temperature below the cloud point prior to use in order to minimize in-process heating costs. Unfortunately, the size of the particles of precipitated polymer is large enough so that in an unagitated vessel the particles will normally settle to the bottom thereof. This means that either the vessel must be provided with an agitator or else the temperature of the composition must be maintained above the cloud point.

It has now been found that when a solution of polyethylene in wax is cooled from above the cloud point to below the cloud point, the amount of polyethylene which precipitates and settles to the bottom of the vessel in which the solution is contained is eliminated or at least substantially reduced by adding a small amount of a certain type of surface active agent to the solution prior to the cooling. Although the use of the surface active agent does not prevent precipitation of the polyethylene, at least not entirely, as is evidenced by the fact that the solution still becomes turbid when cooled to below the cloud point, it does reduce the size of the precipitated particles and thereby the tendency of the latter to settle. Hence the amount of polyethylene which both precipitates and settles out is reduced.

The polyethylene-wax compositions normally used for coating paperboard, etc., and to which the present invention is applicable are described in more detail as follows. The wax component will be paraffin or microcrystalline wax both of which are obtained from, and only from, petroleum by well-known techniques. Paraffin waxes normally have melting points of 110°–165° F. (ASTM D87–57), penetrations at 77° F. of 5–25 dmm. (ASTM D–1321–61T, 100 g., 5 sec.) and viscosities at 210° F. of 30–50 S.U.S. (ASTM D446–53). Microcrystalline waxes usually have melting points of 140°–210° F., penetrations at 77° F. of 5–25 dmm. and viscosities at 210° F. of 60–100 S.U.S., the ASTM tests for determining these properties being the same as for the paraffin waxes except in the case of melting point which is ASTM D127–60. Preferably the melting points of the paraffin and microcrystalline waxes are 120°–140° F. and 150°–180° F., respectively. Preferably the wax is paraffin wax.

The polyethylene component of the composition will normally have a molecular weight of 1000–20,000 (by solution viscosity) and preferably has a molecular weight of 2000–12,000. Although not critical it will normally have a density in the range of 0.87–0.97 and a melt index of 0.1–200, preferably 0.1–100.

The amount of polyethylene in the composition will be 0.1–15%, preferably 0.5–5%, based on the total weight of wax and polyethylene. All percentages and parts herein are by weight. Within these ranges the amount of polyethylene will depend upon the intended use of the composition and the property of the wax which it is desired to improve. The amount of wax in the composition will therefore be 85–99.9%, preferably 95–99.9%.

The surface active agents suitable for the present purpose are widely known articles of commerce which are used mainly as wetting agents, detergents, etc. They can be either of two types, nonionic or anionic. As will be apparent from the examples hereinafter cationic surface active agents are unsuitable for the present purpose. As is well known all surface active agents are compounds whose molecules contain two parts, a hydrophobic part and a hydrophilic part. The ionic surface active agents form ions in solution and if the ion containing the hydrophobic group is a negative ion, i.e., an anion, the compound is an anionic surface active agent. If the ion containing the hydrophobic group is a cation, the compound is a cationic surface active agent. The nonionic surface active agents do not form ions in solution.

There are a large number of well-known anionic and nonionic surface active agents. See, for example, the extensive compilation at pages 515–517 of Kirk-Othmer, Encyclopedia of Chemical Technology, vol. 13, Interscience, 1954. Examples of anionic surface active agents include sodium alkyl benzene sulfonates, sodium alkyl naphthalene sulfonates, sodium fatty alcohol sulfates, esters of sodium sulfosuccinic acid, sodium salts of sulfated monoglycerides, sodium - N - methyl-N-oleyltaurate, sodium oleylisethionate, sodium salts of condensation products of fatty acid chlorides and degraded proteins, sodium alkylbenzimidazole sulfonate, etc. Examples of nonionic surface active agents include alkylphenyl polyoxyethylene ethers, polyoxyethylene stearate and oleate, polyoxyethylene abietate, fatty acid esters of sorbitan, tris(polyoxyethylene) sorbitan monolaurate, tris (polyoxyethylene) sorbitan monooleate, etc.

Certain types of surface active agents are preferred for the present purpose because of their availability, low cost, etc. One such type are the alkyl aryl sulfonates which are sodium salts of aromatic sulfonic acids containing an alkyl side chain. The aryl nucleus is usually the benzene or naphthalene nucleus and the alkyl group usually contains 5–20 carbon atoms. Thus these agents usually have the formula $RC_6H_4SO_3Na$ or $RC_{10}H_6SO_3Na$ wherein R is an alkyl group.

Another preferred type are the surface active agents generally known as fatty alcohol sulfates. They are the sodium salts of the monoesters of sulfuric acid with n-aliphatic alcohols containing 8–18 carbon atoms. They have the formula $CH_3(CH_2)_nOSO_3Na$ where $n=7$–$17$.

Another preferred type are esters of sodium sulfosuccinic acid. These are prepared by completely esterifying maleic acid with alcohols containing 4–8 carbon atoms and subsequently adding sodium bisulfite at the double bond of the unsaturated ester. Preferably the alcohol is 2-ethyl-1-hexanol.

A final group of preferred surface active agents are the alkylphenyl polyoxyethylene ethers. These agents have the formula $RC_6H_4$-O-$(CH_2CH_2O)_nH$ where R is an alkyl group usually having 5–20 carbon atoms and $n$ is 2–20.

The amount of surface active agent necessary to prevent or substantially reduce the settling out of the polyethylene will vary but will usually be 0.001–1%, preferably 0.01–0.1%, based on the total weight of wax and polyethylene. In many cases amounts within the lower end of the former range, e.g., 0.001–0.01%, will be effective. In any event the amount used must be sufficient to inhibit the settling out of the polyethylene.

The surface active agent is added to and mixed with the wax-polyethylene solution prior to cooling the latter below its cloud point. Preferably the wax is heated to 225°–250° F., the polyethylene and surface active agent are added, the mixture is stirred until it is uniform and the resulting solution of polyethylene in wax containing the surface active agent is then cooled below the cloud point.

The following example illustrates the invention more specifically.

Example 99 parts of a paraffin wax having a melting point of 140° F. is heated to 225° F. Next 1 part of a polyethylene having an average molecular weight of 2000 and being known commercially as AC–6 is added to the molten wax and the mixture is stirred for a few minutes until the polyethylene has dissolved in the wax. This 1% solution is then divided into nine 300 ml. portions (Nos. 1–9) each of which is placed in a 400 ml. beaker. Portion 1 is allowed to slowly cool and it is observed that polyethylene first precipitates from the solution at 197° F. Hence the cloud point of the solution is 197° F. A surface active agent is added to each of Portions 3–9 and each mixture of surface active agent in the 1% polyethylene solution is thoroughly mixed at 225° F. Nothing is added to Portion 2. The surface active agent added and amount thereof are as follows:

| Portion | Surface Active Agent | Type | Amt., percent |
|---|---|---|---|
| 2 | None | | |
| 3 | Nonylphenyl polyoxyethylene ether. | Nonionic | 0.1 |
| 4 | do | do | 0.01 |
| 5 | Di(2-ethyl hexyl) ester of sodium sulfosuccinic acid. | Anionic | 0.1 |
| 6 | do | do | 0.005 |
| 7 | Mixture of alkyl benzene sulfonates where alkyl contains 10-20 carbon atoms. | do | 0.01 |
| 8 | Sodium cetyl sulfate | do | 0.01 |
| 9 | $CH_3(CH_2)_{16}N\begin{matrix}(CH_2CH_2O)_xH\\(CH_2CH_2O)_yH\end{matrix}$ where x+y=5 | Cationic | 0.1 |

The beakers containing portions 2–9 are then placed in an oven maintained at 195° F. After 72 hours in the oven each beaker is removed and examined to determine if any polyethylene has settled to the bottom of the beaker. The results are as follows: In Portion 2 a substantial quantity of the polyethylene has settled to the bottom of the beaker. By holding the beaker overhead and looking at its bottom it is apparent that the polyethylene which has settled out covers about one-third of the bottom of the beaker. Portion 9 shows essentially the same results as portion 2. Portions 3–8 all show essentially the same results which are as follows: The solutions are slightly turbid which indicates that some polyethylene precipitation has occurred. However, when the bottom of each beaker is examined in the manner described above, it is found that almost no polyethylene has settled out. At the most not more than about 5% of the bottom of each beaker is covered.

The invention claimed is:

1. In a process in which a solution of polyethylene in petroleum wax containing 0.1–15% polyethylene and 85–99.9% petroleum wax is cooled from a temperature above the cloud point of said solution to a temperature below same, whereby polyethylene precipitates from and settles out of said solution, the improvement for reducing the particle size of the precipitated polyethylene particles and thereby the tendency of said precipitated particles to settle out of the solution which comprises adding a surface agent to the first-mentioned solution prior to said cooling, said surface active agent being selected from the group consisting of esters of sodium sulfosuccinic acid, alkyl aryl sulfonates, fatty alcohol sulfates, polyoxyethylene alkylphenyl ethers, sulfated monoglycerides, sodium-N-methyl-N-oleyltaurate, sodium oleylisethionate, sodium alkylbenzimidazole sulfonate, polyoxyethylene stearates and oleates, polyoxyethylene abietate, fatty acid esters of sorbitan, tris (polyoxyethylene) sorbitan monolaurate and tris (polyoxyethylene) sorbitan monooleate and the amount of said surface active agent being 0.001–1% by weight of the first-mentioned solution, sufficient to reduce said settling.

2. Process according to claim 1 wherein said petroleum was is paraffin wax.

3. Process according to claim 1 wherein the first-mentioned solution contains 0.5–5% polyethylene and 95–99.5% wax.

4. Process according to claim 1 wherein said surface active agent is an ester of sodium sulfosuccinic acid.

5. Process according to claim 1 wherein said surface active agent is an alkyl aryl sulfonate.

6. Process according to claim 1 wherein said surface atcive agent is a fatty alcohol sulfate.

7. Process according to claim 1 wherein said surface active agent is a polyoxyethylene alkylphenyl ether.

8. Process of reducing the tendency of the polyethylene in a solution of polyethylene in molten petroleum wax containing 0.1–15% polyethylene and 85–99.9% petroleum wax from precipitating from and settling out of said solution when the latter is cooled from a temperature above its cloud point to a temperature below its cloud point which comprises adding to said solution a surface active agent selected from the group consisting of esters of sodium sulfosuccinic acid, alkyl aryl sulfonates, fatty alcohol sulfates, polyoxyethylene alkylphenyl ethers, sulfated monoglycerides, sodium-N-methyl-N-oleyltaurate, sodium oleylisethionate, sodium alkylbenzimidazole sulfonate, polyoxyethylene stearates and oleates, polyoxyethylene abietate, fatty acid esters of sorbitan, tris (polyoxyethylene) sorbitan monolaurate and tris (polyoxyethylene) sorbitan monooleate, the amount of said surface active agent being 0.001–1% by weight of said solution, sufficient to inhibit said precipitating and settling out.

9. Process according to claim 8 wherein said surface active agent is an ester of sodium sulfosuccinic acid.

10. Process according to claim 8 wherein said surface active agent is a polyoxyethylene alkylphenyl ether.

11. Process according to claim 8 wherein said surface active agent is an alkyl aryl sulfonate.

12. Process according to claim 8 wherein said surface active agent is a fatty alcohol sulfate.

13. Process according to claim 1 wherein said surface active agent is a sulfated monoglyceride.

14. Process according to claim 1 wherein said surface active agent is sodium-N-methyl-N-oleyltaurate.

15. Process according to claim 1 wherein said surface active agent is sodium oleylisethionate.

16. Process according to claim 1 wherein said surface active agent is a sodium alkylbenzimidazole sulfonate.

17. Process according to claim 1 wherein said surface active agent is selected from the group consisting of polyoxyethylene stearates and oleates.

18. Process according to claim 1 wherein said surface active agent is polyoxyethylene abietate.

19. Process according to claim 1 wherein said surface active agent is a fatty acid ester of sorbitan.

20. Process according to claim 1 wherein said surface active agent is tris(polyoxyethylene) sorbitan monolaurate.

21. Process according to claim 1 wherein said surface active agent is tris(polyoxyethylene) sorbitan monooleate.

References Cited
UNITED STATES PATENTS

| | | | |
|---|---|---|---|
| 2,728,735 | 12/1955 | Anderson | 260—28.5 |
| 3,061,493 | 10/1962 | Anderson | 260—28.5 |
| 3,117,101 | 1/1964 | Moyer | 260—28.5 |

MORRIS LIEBMAN, *Primary Examiner.*

B. A. AMERNICK, *Assistant Examiner.*